Aug. 31, 1965   C. R. BEUTER ETAL   3,203,041
DEVICE FOR CUTTING AND INSERTING LOCKING
ELEMENTS INTO THREADED FASTENERS
Original Filed Feb. 27, 1961
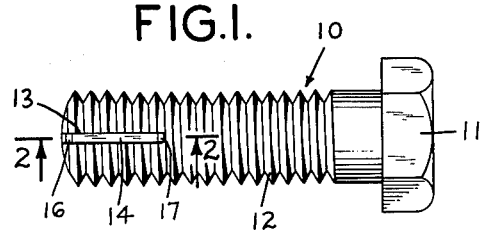
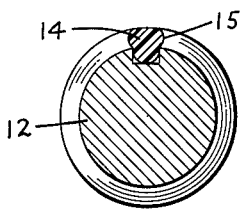
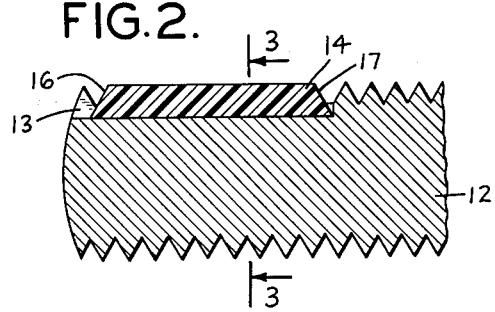
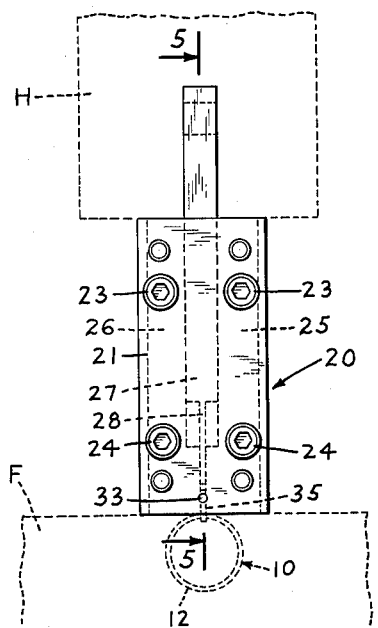
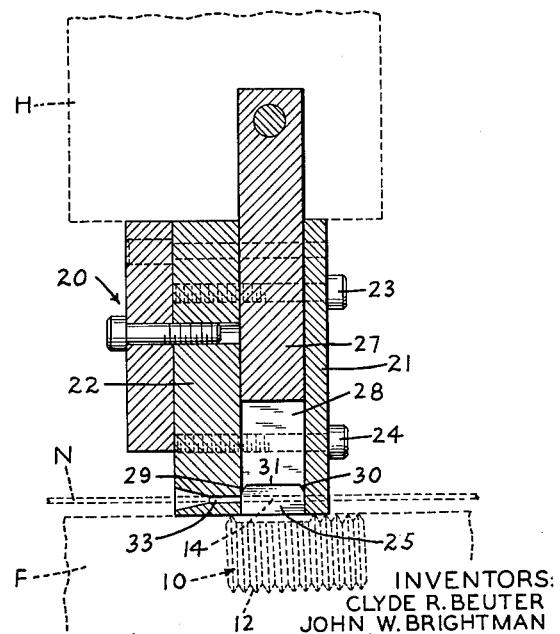
INVENTORS:
CLYDE R. BEUTER
JOHN W. BRIGHTMAN
BY
THEIR ATTORNEYS United States Patent Office 3,203,041
Patented Aug. 31, 1965

3,203,041
DEVICE FOR CUTTING AND INSERTING LOCKING ELEMENTS INTO THREADED FASTENERS
Clyde R. Beuter, Beverly Hills, Mich., and John W. Brightman, Ridgewood, N.J., assignors, by mesne assignments, to United Shoe Machinery Corporation, Boston, Mass., a corporation of New Jersey
Original application Feb. 27, 1961, Ser. No. 91,811. Divided and this application Sept. 26, 1963, Ser. No. 312,831
3 Claims. (Cl. 18—1)

This application is a division of our U.S. application, Serial No. 91,811, filed February 27, 1961, and now abandoned.

This invention relates to apparatus for cutting and inserting locking elements in self-locking threaded devices such as, for example, self-locking bolts, machine screws, threaded inserts and the like.

Nuts, bolts, screws and the like have been provided with resilient inserts in one side thereof to produce the locking action described more particularly in the Boots U.S. Patent No. 2,539,887. In some self-locking screws and bolts, a strip of resilient material, such as "nylon" (high molecular weight synthetic linear polyamide) or its equivalent is positioned in a groove extending lengthwise of the threaded portion of the bolt or screw. In order to facilitate application of a nut to such a bolt, one end of the strip may be chamfered or tapered so that the threads of the cooperating nut will pass readily over the insert without dislodging it. In the formation of such inserts, the opposite end of the insert is complementally beveled or chamfered so that the strip has a projecting tip which sometimes catches on other elements and causes the strip to be dislodged from the groove thereby rendering the threaded device defective.

In accordance with the present invention, apparatus is provided for cutting inserts from plastic filaments or rods in such a way that the inserts have oppositely inclined ends which are free from projecting tips or points.

More particularly, the apparatus for forming the locking strips includes a blade having wedge-shaped cutting portions at its ends which form chamfered ends on inserts severed from a rod or strip of resilient material, compresses the insert by forcing it through a narrow ejection slot and inserts the strip in a groove formed in the threaded device. Upon expansion of the insert in the groove due to the inherent resiliency of the insert it will engage tightly in and resist dislodgment from the groove.

Inasmuch as the resilient inserts are not readily dislodged from the screws, bolts or the like, fewer defective articles will be produced than heretofore.

For a better understanding of the present invention, reference may be had to the accompanying drawing in which:

FIGURE 1 is a side elevational view of a typical self-locking screw produced with apparatus embodying the present invention;

FIGURE 2 is a slightly enlarged view taken on line 2—2 of FIGURE 1;

FIGURE 3 is a view in section on line 3—3 of FIGURE 2;

FIGURE 4 is a side elevational view of an apparatus embodying the present invention for cutting and inserting the locking strips in screws and the like; and FIGURE 5 is a view in cross section taken on line 5—5 of FIGURE 4.

As shown in FIGURES 1 to 3, a threaded machine screw is chosen to illustrate the invention. It will be understood, however, that other threaded devices such as bolts, screw threaded inserts, nuts, and the like may be provided with locking inserts of the type produced with apparatus embodying the present invention.

The machine screw 10 includes the usual hex head 11 and threaded shank 12 in which is formed, by a milling or other operation, a groove or recess 13 which intersects a plurality of the threads of the shank and has an open end at the end of the screw shank. Mounted within the groove or recess 13 is a strip 14 of resilient locking material such as "nylon" which is initially of circular cross section but has been compressed during its insertion into the groove to a non-circular cross section so that it fits within the groove. Expansion of the insert causes it to be firmly seated in, and gripped by the walls of, the groove. It also bulges out slightly as at 15 (FIGURE 3) between the threads of the screw. As illustrated, the outer surface of the insert 14 extends about to the crest line of the threads. It may be disposed between the crest line and the root line of the thread or may project slightly beyond the crest line.

In order to avoid dislodging the strip 14 from the groove, its opposite ends are provided with outwardly converging beveled or chamfered faces 16 and 17. The face 16 due to its rearward inclination facilitates the insertion of the screw into a nut or other complementally threaded hole. The opposite chamfered end 17 does not present any projections or corners which might be engaged by other associated elements and thereby cause the insert to be dislodged from the screw during shipment and the like.

The inserts 14 may be formed and inserted readily in screws and the like by means of the apparatus according to the invention shown in FIGURES 4 and 5. It includes a main housing 20 having a pair of side plates 21 and 22 secured by means of socket head screws 23, 24 to narrow front and back plates 25 and 26. A support or fixture F in which the screw 10 is inserted is disposed below the housing 20.

A cutter 27 is mounted in the housing between the plates 21, 22 and 25, 26 and is reciprocated by means of a suitable reciprocating slide (not shown) in the head H of the machine. As shown in FIGURES 4 and 5, the cutter 27 has a thin blade portion 28 at its lower end having downwardly extending wedge-shaped points 29 and 30 at the opposite ends of its lower edge 31.

During reciprocation of the blade 27, it traverses a bore 33 which extends through the side plates 21 and 22 and recieves a filament or rod N of resilient material from which the inserts are cut. As shown particularly in FIGURE 4, the diameters of the filament N and the bore 33 are greater than the width or thickness of the blade portion 28. Accordingly, when the cutter 27 is forced downwardly, the filament is sheared and the insert 14 cut therefrom is forced downwardly through the discharge slot 35 which fits the blade and is compressed therein prior to its insertion into the groove 13 in the screw. The blade 28 thus cuts an insert of a desired length from a continuous filament, compresses the ends of the insert and forces it through the discharge slot 35 thereby compressing it and forcing it into groove 13 in the screw. The transverse compression of the severed strip as it passes through the slot 35 together with the wedging of the ends of the strip by the points 29 and 30 of the blade permanently deforms the strip so that it is changed from circular to a more flattened cross-section and also causes the ends of the strip to become inclined or chamfered. The strip will recover somewhat but will not tend to return to its initially circular cross-section, even if unconfined. Inasmuch as the groove 13 is about the same width as the slot 35 slight expansion of the insert anchors it securely in the groove.

It will be understood that the diameter of the insert will depend largely upon the size of the threaded device in which it is used. The length of the insert also may vary depending upon requirements. Accordingly, the example of the invention given herein should be considered as illustrative and not as limiting the scope of the following claims.

We claim:

1. Apparatus for cutting locking strips for threaded members comprising a hollow housing having an elongated slit extending transversely of one end thereof, and connecting with the interior of said housing, a bore extending transversely of said housing and lengthwise of said slit bewteen its inner and outer ends, said bore being of greater diameter than said slit to receive a plastic filament of greater cross-sectional width than said slit, and a blade in said housing and reciprocable in said slit transversely of said bore for cutting a section from said filament substantially equal in length to the length of said slit, forcing said section through said slit to compress said section transversely and ejecting it from said housing through said slit.

2. A device for cutting resilient inserts for self-locking threaded devices comprising a hollow housing having one open end and an opposite end with a narrow slit therein, a plunger slidably mounted in said housing having a thin blade thereon substantially complemental to said slit and movable with said plunger between a position retracted within said housing to a position projected from said slit, a hole extending transversely of said housing and lengthwise of said slit between its inner and outer ends for receiving a resilient filament of greater width than the width of said slit, and means for sliding said plunger lengthwise of said housing to sever a section of said filament, compress said section transversely in said slit and eject said section from said housing through said slit.

3. The device set forth in claim 2 comprising a shearing edge on the end of said blade having wedge-shaped points at opposite ends of said edge for chamfering the ends of said section of filament severed by said blade.

References Cited by the Examiner

UNITED STATES PATENTS

| 1,396,090 | 11/21 | Bartlett | 18—1 |
| 1,739,790 | 12/29 | Glaxner | 18—1 |
| 1,960,881 | 5/34 | Sunbury | 18—1 |
| 2,289,787 | 7/42 | Kaschke et al. | 18—12 XR |

FOREIGN PATENTS 584,697  10/59  Canada.

WILLIAM J. STEPHENSON, *Primary Examiner.*